United States Patent
Adachi et al.

(10) Patent No.: US 10,477,380 B2
(45) Date of Patent: Nov. 12, 2019

(54) BASE STATION AND RADIO TERMINAL

(71) Applicant: KYOCERA CORPORATION, Kyoto (JP)

(72) Inventors: Hiroyuki Adachi, Kawasaki (JP); Takahiro Saiwai, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 142 days.

(21) Appl. No.: 15/573,115

(22) PCT Filed: May 11, 2016

(86) PCT No.: PCT/JP2016/064013
§ 371 (c)(1),
(2) Date: Nov. 9, 2017

(87) PCT Pub. No.: WO2016/185967
PCT Pub. Date: Nov. 24, 2016

(65) Prior Publication Data
US 2018/0091964 A1    Mar. 29, 2018

Related U.S. Application Data

(60) Provisional application No. 62/162,211, filed on May 15, 2015.

(51) Int. Cl.
*H04W 8/00* (2009.01)
*H04W 72/04* (2009.01)
(Continued)

(52) U.S. Cl.
CPC ....... *H04W 8/005* (2013.01); *H04W 72/0406* (2013.01); *H04W 24/10* (2013.01);
(Continued)

(58) Field of Classification Search
CPC ... H04W 8/005; H04W 8/00; H04W 72/0406; H04W 92/18; H04W 76/10; H04W 24/10;
(Continued)

(56) References Cited

U.S. PATENT DOCUMENTS

2014/0335853 A1* 11/2014 Sartori .............. H04W 56/0015
455/426.1
2015/0009908 A1* 1/2015 Kalapatapu ......... H04L 12/6418
370/329

(Continued)

OTHER PUBLICATIONS

3GPP TR 23.713 v1.1.0 (Apr. 2015), 'Study on extended architecture support for proximity-based services' (Release 13), pp. 1-75. (Year: 2015).*

(Continued)

*Primary Examiner* — Melvin C Marcelo
(74) *Attorney, Agent, or Firm* — Studebaker & Brackett PC

(57) ABSTRACT

A base station according to a present embodiment is a base station configured to manage a cell, and comprises: a controller configured to transmit, if a relay terminal configured to relay data by direct communication between a remote terminal and a network is not present in a vicinity of a radio terminal located within the cell, control information to the radio terminal. The control information is information for starting transmission of a discovery signal for discovering another radio terminal that can be the relay UE.

9 Claims, 12 Drawing Sheets

(51) Int. Cl.
| | |
|---|---|
| H04W 76/10 | (2018.01) |
| H04W 24/10 | (2009.01) |
| H04W 56/00 | (2009.01) |
| H04W 88/04 | (2009.01) |
| H04W 88/08 | (2009.01) |

(52) U.S. Cl.
CPC .......... *H04W 56/001* (2013.01); *H04W 76/10* (2018.02); *H04W 88/04* (2013.01); *H04W 88/08* (2013.01)

(58) Field of Classification Search
CPC ... H04W 48/16; H04W 56/001; H04W 88/04; H04W 88/08; H04L 67/16
See application file for complete search history.

(56) References Cited

U.S. PATENT DOCUMENTS

| | | | | |
|---|---|---|---|---|
| 2015/0029866 A1* | 1/2015 | Liao | ...................... | H04W 4/023 370/241 |
| 2016/0212721 A1* | 7/2016 | Sheng | ................... | H04W 76/14 |
| 2016/0285539 A1* | 9/2016 | Sadiq | .................... | H04W 8/005 |

OTHER PUBLICATIONS

International Search Report issued in PCT/JP2016/064013; dated Jul. 26, 2016.
3rd Generation Partnership Project; 3rd Generation Partnership Project; Technical Specification Group Services and System Aspects; Proximity-based services (ProSe); 3GPP TS 23.303 V12.4.0; Mar. 2015; pp. 1-63; Release 12; 3GPP Organizational Partners.

* cited by examiner

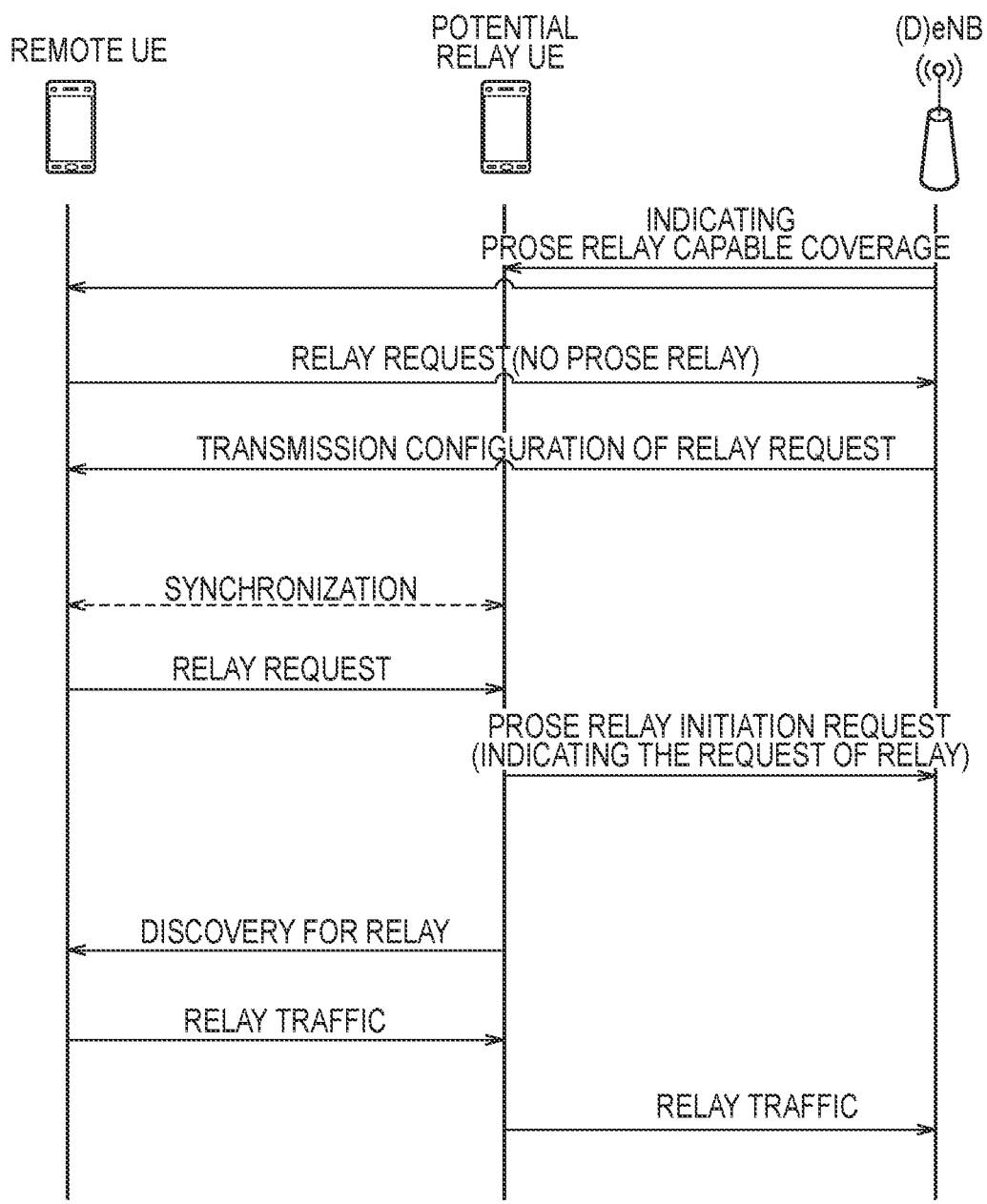

BASE STATION AND RADIO TERMINAL

TECHNICAL FIELD

The present application relates to a base station and a radio terminal used in a communication system.

BACKGROUND ART

In 3GPP (3rd Generation Partnership Project), which is a project aiming to standardize a mobile communication system, the specifications of a proximity service (ProSe: Proximity-based Services) have been designed.

Here, the ProSe includes a UE-to-Network relay in which a first radio terminal (ProSe UE-to-Network Relay) relays, between a second radio terminal (Remote UE) which is outside a network and the network, data (traffic) of the second radio terminal.

PRIOR ART DOCUMENT

Non-Patent Document

Non Patent Document 1: 3GPP Technical Specification "TS 23.303 V12.4.0" Mar. 19, 2015

SUMMARY OF THE INVENTION

However, the details of a UE-to-Network relay have not been designed in the current specification, and thus, the UE-to-Network relay may not be effectively utilized.

Therefore, the present application aims to enable the UE-to-Network relay to be effectively utilized.

A base station according to an embodiment is a base station configured to manage a cell, and comprises: a controller configured to transmit, if a relay terminal configured to relay data by direct communication between a remote terminal and a network is not present in a vicinity of a radio terminal located within the cell, control information to the radio terminal. The control information is information for starting transmission of a discovery signal for discovering another radio terminal that can be the relay UE.

A radio terminal according to an embodiment is a radio terminal located within a cell and comprises: a receiver configured to receive control information for starting reception of a discovery signal in a proximity service if a relay terminal configured to relay data by direct communication between a remote terminal which is outside a network and the network is not present in a vicinity of the radio terminal; and a transmitter configured to start transmitting the discovery signal on a basis of the control information.

A radio terminal according to an embodiment is a radio terminal located within a cell and comprises: a receiver configured to receive a discovery signal in a proximity service; and a transmitter configured to start transmitting, if the radio terminal can be a relay terminal that relays data by direct communication between a remote terminal which is outside a network and the network, a special discovery signal transmitted by the radio terminal that can be the relay terminal, in response to reception of the discovery signal.

A radio terminal according to an embodiment is a radio terminal located within a cell and comprises: a receiver configured to receive control information for starting reception of a discovery signal in a proximity service if a relay terminal configured to relay data by direct communication between a remote terminal which is outside a network and the network is not present in a vicinity of another radio terminal; and a transmitter configured to start transmitting the discovery signal on a basis of the control information.

A base station according to an embodiment is a base station configured to manage a cell, comprises: a controller configured to determine, if a relay terminal configured to relay data by direct communication between a remote terminal and a network is not present in the vicinity of a first radio terminal located within the cell, whether or not a second radio terminal is to be the relay terminal configured to relay data of the first radio terminal, based on location information of the first radio terminal and location information of the second radio terminal that can be the relay terminal.

BRIEF DESCRIPTION OF DRAWINGS

FIG. 14 is a diagram for describing the ProSe UE-to-Network relay procedure started by the remote UE which is inside the network (InC: In Coverage).

DESCRIPTION OF THE EMBODIMENT

Overview of Embodiment

Figure 1:
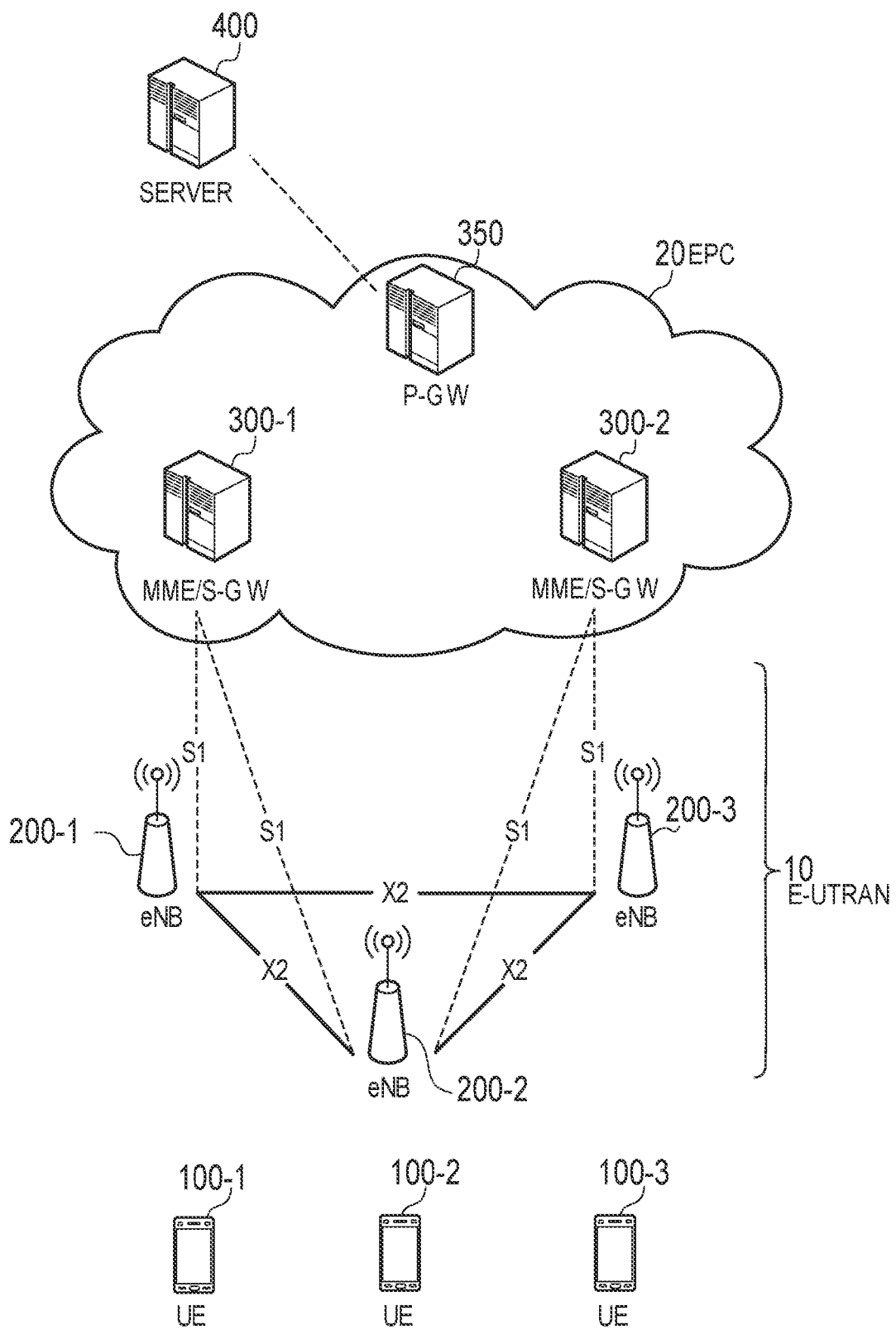
FIG. 1 is a diagram illustrating a configuration of a Long Term Evolution (LTE) system.

In the current specification, the details of a UE-to-Network relay have not been designed, and in particular, the details of the UE-to-Network relay for a case where a relay terminal (ProSe UE-to-Network Relay) is not present in the vicinity of (in the proximity of) a user terminal have not been designed. Therefore, one of the objects of the present application is, if the relay terminal is not present in the vicinity of the user terminal, to enable the relay UE for executing the UE-to-Network relay to be established.

A base station according to an embodiment is a base station configured to manage a cell, and comprises: a controller configured to transmit, if a relay terminal configured to relay data by direct communication between a remote terminal and a network is not present in a vicinity of a radio terminal located within the cell, control information to the radio terminal. The control information is information for starting transmission of a discovery signal for discovering another radio terminal that can be the relay UE.

The controller may transmit the control information, if a report indicating that the relay terminal is not present in the vicinity, or a report indicating that the relay terminal is not be present in the vicinity is received from the radio terminal.

The control information may include at least any one of information on a transmission resource pool used only for discovering the another radio terminal that can be the relay terminal, information on transmission power of the discovery signal, information for transmitting, in a period of transmitting the discovery signal, a signal related to synchronization in a proximity service, and information for designating an application code used for the discovery signal.

The information for transmitting the signal related to synchronization may include an identifier to be included into the signal related to synchronization.

The controller may start establishing a UE-to-Network relay connection between the base station and the another radio terminal, upon receiving, from the radio terminal, a report indicating that the another radio terminal that can be the relay UE is discovered.

If the report includes information indicating a reception level of a signal related to synchronization transmitted from the another radio terminal, the controller may determine whether or not to start establishing the UE-to-Network relay connection based on the information indicating the reception level.

The controller may transmit, to the another radio terminal that can be the relay terminal, second control information for starting reception of the discovery signal.

The controller may include, into the second control information, at least some pieces of information included in the control information.

The controller may start establishing a UE-to-Network relay connection between the base station and the another radio terminal, upon receiving, from the another radio terminal, a report indicating that the radio terminal is discovered.

If the report includes information indicating a reception level of a signal related to synchronization transmitted from the radio terminal, the controller may determine whether or not to start establishing the UE-to-Network relay connection based on the information indicating the reception level.

A radio terminal according to an embodiment is a radio terminal located within a cell and comprises: a receiver configured to receive control information for starting reception of a discovery signal in a proximity service if a relay terminal configured to relay data by direct communication between a remote terminal which is outside a network and the network is not present in a vicinity of the radio terminal; and a transmitter configured to start transmitting the discovery signal on a basis of the control information.

A radio terminal according to an embodiment is a radio terminal located within a cell and comprises: a receiver configured to receive a discovery signal in a proximity service; and a transmitter configured to start transmitting, if the radio terminal can be a relay terminal that relays data by direct communication between a remote terminal which is outside a network and the network, a special discovery signal transmitted by the radio terminal that can be the relay terminal, in response to reception of the discovery signal.

The transmitter may transmit, in a period of transmitting the special discovery signal, not only the special discovery signal, but also a signal related to synchronization in a proximity service.

The transmitter may transmit, to a base station managing the cell, an identifier included in the special discovery signal.

The transmitter may request, before transmitting the special discovery signal, a base station or a network apparatus managing the cell to assign an identifier to be included into the special discovery signal. The transmitter may transmit, in response to the request, the special discovery signal including the identifier assigned by the base station or the network apparatus.

The special discovery signal may include information indicating that a UE-to-Network relay connection is not established between the radio terminal and the base station managing the cell.

A radio terminal according to an embodiment is a radio terminal located within a cell and comprises: a receiver configured to receive control information for starting reception of a discovery signal in a proximity service if a relay terminal configured to relay data by direct communication between a remote terminal which is outside a network and the network is not present in a vicinity of another radio terminal; and a transmitter configured to start transmitting the discovery signal on a basis of the control information.

A base station according to an embodiment is a base station configured to manage a cell, comprises: a controller configured to determine, if a relay terminal configured to relay data by direct communication between a remote terminal and a network is not present in the vicinity of a first radio terminal located within the cell, whether or not a second radio terminal is to be the relay terminal configured to relay data of the first radio terminal, based on location information of the first radio terminal and location information of the second radio terminal that can be the relay terminal.

The controller may transmit, to the second radio terminal, information by which the second radio terminal reports the location information of the second radio terminal.

The base station may comprise a receiver configured to receive, from the radio terminal, a report indicating that the relay terminal is not present in the vicinity. The controller may determine, based on the location information of the first radio terminal included in the report, whether or not the second radio terminal is to be the relay terminal.

The controller may transmit, to the second radio terminal, control information for starting transmission of a discovery signal in a proximity service, upon determining that the second radio terminal is to be the relay terminal configured to relay data of the first radio terminal.

The base station comprises a receiver configured to receive, from the radio terminal, a report on the radio signal. The base station may determine, based on the report, whether or not to cause the second radio terminal to relay data of the first radio terminal.

Embodiment (Mobile Communication System)

Hereinafter, an LTE system being a mobile communication system according to an embodiment will be described. FIG. 1 is a configuration diagram of an LTE system.

As shown in FIG. 1, the LTE system comprises UEs (User Equipments) 100, E-UTRAN (Evolved Universal Terrestrial Radio Access Network) 10, and EPC (Evolved Packet Core) 20. In addition, a server 400 is provided in an external network not managed by an operator of a cellular network.

The UE 100 corresponds to a radio terminal. The UE 100 is a mobile communication device and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells. The eNB 200 performs radio communication with the UE 100 that establishes a connection with the cell of the eNB 200. The eNB 200, for example, has a radio resource management (RRM) function, a function of routing user data (hereinafter, simply referred to as "data"), and a measurement control function for mobility control and scheduling. The "cell" is used as a term indicating a minimum unit of a radio communication area. It is used as a term indicating a function of performing radio communication with the UE 100.

The EPC 20 corresponds to a core network. The EPC 20 comprises MME (Mobility Management Entity)/S-GW (Serving-Gateway) 300 and a P-GW (Packet Data Network Gateway) 350. The MME performs various mobility controls and the like, for the UE 100. The S-GW performs control to transfer user data. The MME/S-GW 300 is connected to the eNB 200 via an S1 interface. The E-UTRAN 10 and the EPC 20 constitute a network. A packet data network gateway (P-GW) 350 performs control of relaying user data from the external network (and to the external network).

The server 400 is a ProSe application server (ProSe Application Server). In this case, the Server 400 manages identifiers used in ProSe. For example, the Server 400 stores "EPC ProSe user ID" and "ProSe function ID". Further, the Server 400 maps "application layer user ID" and "EPC ProSe user ID".

Figure 2:
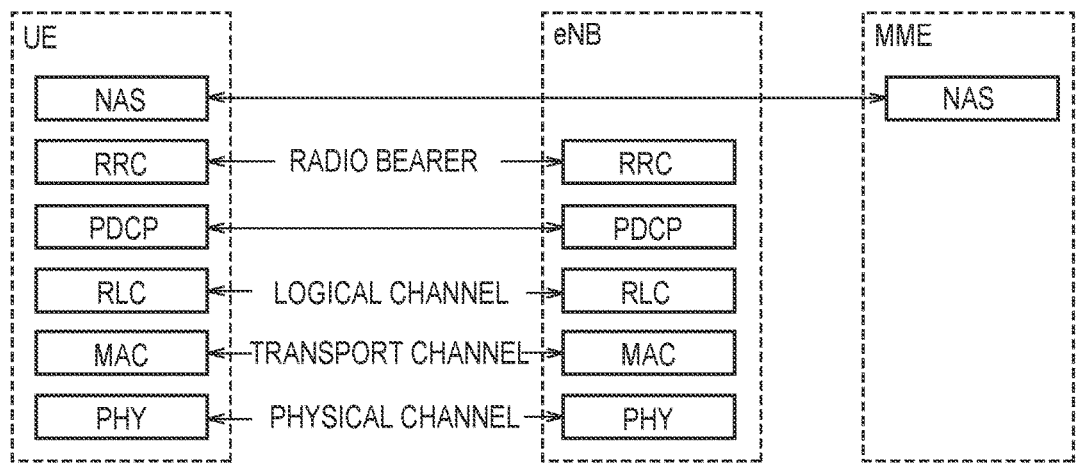
FIG. 2 is a protocol stack diagram of a radio interface in the LTE system.

FIG. 2 is a protocol stack diagram of a radio interface in the LTE system. As shown in FIG. 2, the radio interface protocol is classified into a layer 1 to a layer 3 of an OSI reference model. The layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and a control signal are transmitted through the physical channel.

The MAC layer performs priority control of data, a retransmission process by hybrid ARQ (HARQ), a random access procedure, and the like. Between the MAC layer of the UE 100 and the MAC layer of the eNB 200, data and a control signal are transmitted via a transport channel. The MAC layer of the eNB 200 includes a scheduler. The scheduler decides a transport format of an uplink and a downlink (a transport block size, a modulation and coding scheme (MCS)) and an allocated resource block to the UE 100.

The RLC layer transmits data to an RLC layer of a reception side by using the functions of the MAC layer and the PHY layer. Between the RLC layer of the UE 100 and the RLC layer of the eNB 200, data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a message (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state (a connected state). When the connection is not established between the RRC of the UE 100 and the RRC of the eNB 200, the UE 100 is in an RRC idle state (an idle state).

NAS (Non-Access Stratum) layer positioned above the RRC layer performs session management, mobility management and the like.

Figure 3:
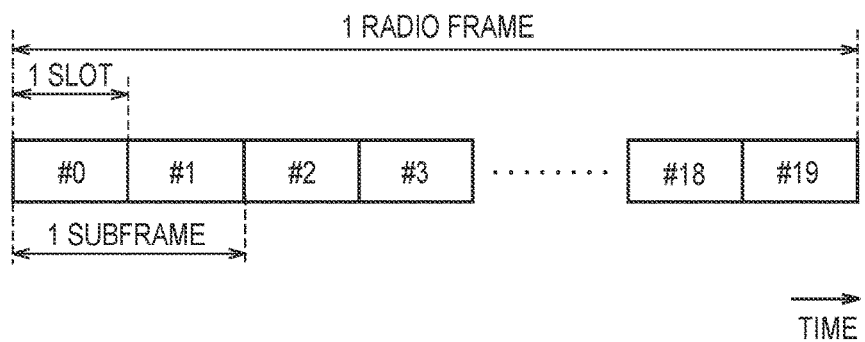
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is employed in a downlink (DL), and SC-FDMA (Single Carrier Frequency Division Multiple Access) is employed in an uplink (UL), respectively.

As shown in FIG. 3, the radio frame is configured by 10 subframes arranged in a time direction. Each subframe is configured by two slots arranged in the time direction. Each subframe has a length of 1 ms, and Each slot has a length of 0.5 ms. Each subframe includes a plurality of resource blocks (RBs) in a frequency direction and includes a plurality of symbols in the time direction. Each resource block includes a plurality of subcarriers in the frequency direction. A resource element (RE) is configured by one symbol and one subcarrier. In addition, among radio resources (time-frequency resources) allocated to the UE 100, a frequency resource is specified by a resource block and a time resource is specified by a subframe (or slot).

In the downlink, an interval of several symbols at the head of each subframe is a region mainly used as a physical downlink control channel (PDCCH) for transmission of a downlink control signal. The details of the PDCCH will be described later. Furthermore, the remaining part of each subframe is a region which can be mainly used as a physical downlink shared channel (PDSCH) for transmission of a downlink data.

In the uplink, both end portions in the frequency direction of each subframe are regions mainly used as a physical uplink control channel (PUCCH) for transmission of an uplink control signal. Furthermore, the remaining part of each subframe is a region which can be mainly used as a physical uplink shared channel (PUSCH) for transmission of an uplink data.

(Proximity Service)

The Proximity Service (ProSe: Proximity-based Services) will be described below. In the ProSe, a plurality of UEs 100 transmit and receive various signals via a direct radio link not passing through an evolved Node-B (eNB) 200. The direct radio link in the ProSe will be referred to as a "sidelink".

The "sidelink" is a UE-to-UE interface for direct discovery and direct communication. The "sidelink" corresponds to a PC5 interface. The PC5 is a reference point between UEs that can use the ProSe used for control for UE-to-NW relaying using direct discovery, direct communication, and the ProSe, and for a user plane. The PC5 interface is a UE-to-UE interface in the ProSe.

As modes of the ProSe, two modes including "direct discovery" and "direct communication" are defined.

The direct discovery is a mode for searching for another UE by directly transmitting, between UEs, a discovery signal without a specified specific destination. In addition, the direct discovery is a procedure for discovering another UE in the neighborhood of the UE, using a direct radio signal in an Evolved Universal Terrestrial Radio Access (E-UTRA) via the PC5. Alternatively, the direct discovery is a procedure employed by the UE 100 that can execute the ProSe for discovering another UE 100 that can execute the ProSe, using only the capability of two UEs 100 based on the E-UTRA technique. The direct discovery is supported only if the UE 100 is provided with a service by the E-UTRAN 10 (the eNB 200 (cell)). If the UE 100 is connected to the cell (the eNB 200) or exists in the cell, the service is provided by the E-UTRAN 10.

Resource allocation types for transmitting (announcement of) a discovery signal (discovery message) include a "type 1" in which the UE 100 selects a radio resource, and a "type 2 (type 2B)" in which the eNB 200 selects a radio resource.

A "Sidelink Direct Discovery" protocol stack includes a physical (PHY) layer, a medium access control (MAC) layer, and a ProSe protocol. Between the PHY layer of a UE (A) and the PHY layer of a UE (B), a discovery signal is transmitted via a physical channel referred to as a physical sidelink discovery channel (PSDCH). Between the MAC layer of the UE (A) and the MAC layer of the UE (B), a discovery signal is transmitted via a transport channel referred to as a sidelink discovery channel (SL-DCH).

The direct communication is a mode for directly transmitting data between UEs by specifying a specific destination (destination group). In addition, the direct communication is communication performed between two or more UEs that can execute the ProSe, through user plane transmission that uses the E-UTRA technique via a route not passing through any network node.

Resource allocation types of the direct communication include a "mode 1" in which the eNB 200 specifies a radio resource of the direct communication, and a "mode 2" in which the UE 100 selects a radio resource of the direct communication.

A direct communication protocol stack includes a physical (PHY) layer, a MAC layer, a radio link control (RLC) layer, and a packet data convergence protocol (PDCP) layer. Between the PHY layer of the UE (A) and the PHY layer of the UE (B), a control signal is transmitted via a physical sidelink control channel (PSCCH), and data is transmitted via a physical sidelink shared channel (PSSCH). In addition, a synchronization signal and the like may be transmitted via a physical sidelink broadcast channel (PSBCH). Between the MAC layer of the UE (A) and the MAC layer of the UE (B), data is transmitted via a transport channel referred to as a sidelink shared channel (SL-SCH). Between the RLC layer of the UE (A) and the RLC layer of the UE (B), data is transmitted via a logical channel referred to as a sidelink traffic channel (STCH).

(UE-to-Network Relaying)

Figure 4:
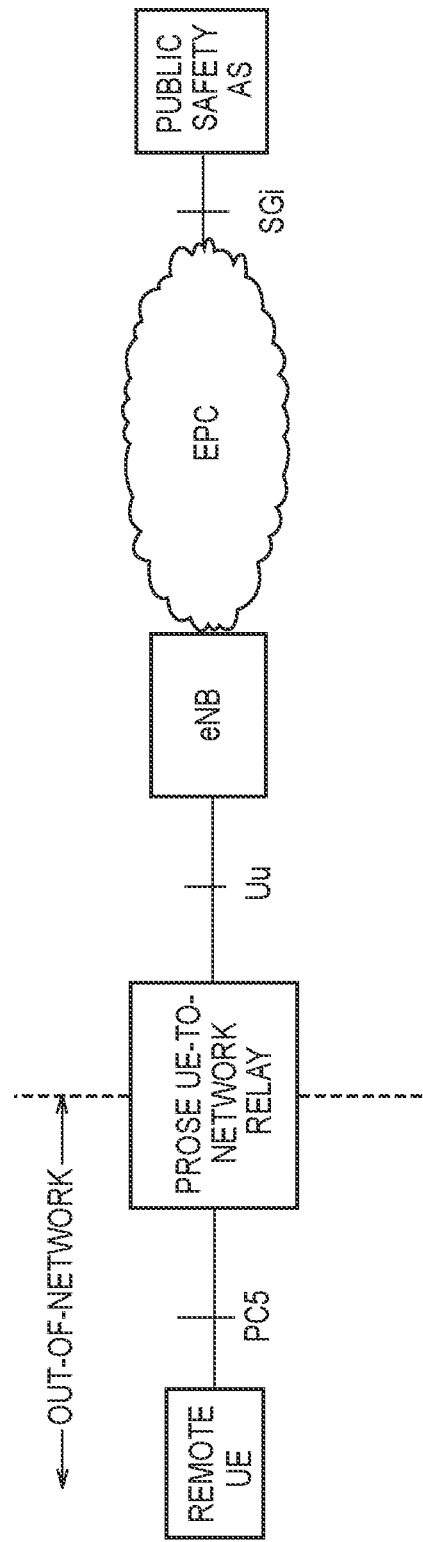
FIG. 4 is a diagram for illustrating UE-network relaying according to an embodiment.

The UE-to-Network relaying (ProSe UE-to-Network Relaying) will be described below using FIG. 4. FIG. 4 is a diagram for illustrating the UE-network relaying according to an embodiment.

In FIG. 4, a remote UE is a UE located outside the network (Out-of-Network). That is, the remote UE is located outside the coverage of the cell. It is noted that, the remote UE may be located within the coverage of the cell. Therefore, the remote UE is a UE 100 to which a direct service is not provided by the E-UTRAN 10 (a UE 100 that is not served by the E-UTRAN 10). In addition, the remote UE 100 can communicate with a packet data network (PDN) via a relay UE to be described later. The remote UE may be a UE for Public Safety (ProSe-enabled Public Safety UE).

In addition, the "ProSe-enabled Public Safety UE" has a configuration in which a home public land mobile network (HPLMN) allows use for public safety. The "ProSe-enabled Public Safety UE" can use the ProSe, and supports procedures in the D2D ProSe and a specific capability for public safety. For example, the "ProSe-enabled Public Safety UE" transmits information for public safety through the proximity service. The information for public safety includes, for example, information on disasters (such as earthquakes and fires), and information used by fire officials or police officials.

The remote UE is provided with the ProSe relay service from the relay UE, as described later. The UE-to-Network relay is executed between the remote UE that is provided with the ProSe relay service and the relay UE that provides the ProSe relay service.

The relay UE (ProSe UE-to Network Relay) provides the ProSe relay service for the remote UE. Specifically, the relay UE provides service continuity of the communication with a packet data network for the remote UE. Therefore, the relay UE relays data (unicast traffic) between the remote UE and the network. The relay UE relays data (traffic) of the remote UE through the proximity service (direct communication). Specifically, the relay UE relays data received from the remote UE (uplink traffic) via the PC5 interface to the eNB 200 via a Uu interface (LTE-Uu) or a Un interface (LTE-Un). Further, the relay UE relays data received from the eNB 200 (downlink traffic) via the Uu interface or the Un interface to the remote UE via the PC5 interface. The relay UE is located only within the network (within the coverage of the cell).

In addition, the relay UE can provide a comprehensive function capable of relaying traffic of an arbitrary type that is related to communication for public safety.

The relay UE and the remote UE can transmit data and control signals between the PHY layers. Similarly, the relay UE and the remote UE can transmit data and control signals between the MAC layers, the RLC layers, and the PDCP layers. Furthermore, the relay UE may have an IP relay (IP-Relay) layer as a higher layer of the PDCP layer. The remote UE may have an IP layer as a higher layer of the PDCP layer. The relay UE and the remote UE can transmit data and control signals between the IP relay layer and the IP layer. In addition, the relay UE can transmit data between the IP relay layer and the IP layer of the IP-GW 350.

It is noted that, in an AS layer (Access Stratum), the relay UE can transmit data (traffic) to the remote UE by using broadcast. In the AS layer, the relay UE may transmit data to the remote UE by using unicast. It is noted that if the UE-to-Network relay is executed by using broadcast, a feedback in the AS layer is not performed, but a feedback in a NAS layer (Non Access Stratum) may be performed, between the relay UE and the remote UE. Further, if the UE-to-Network relay is executed by using unicast, a feedback in the AS layer may be performed.

(Radio Terminal)

Figure 5:
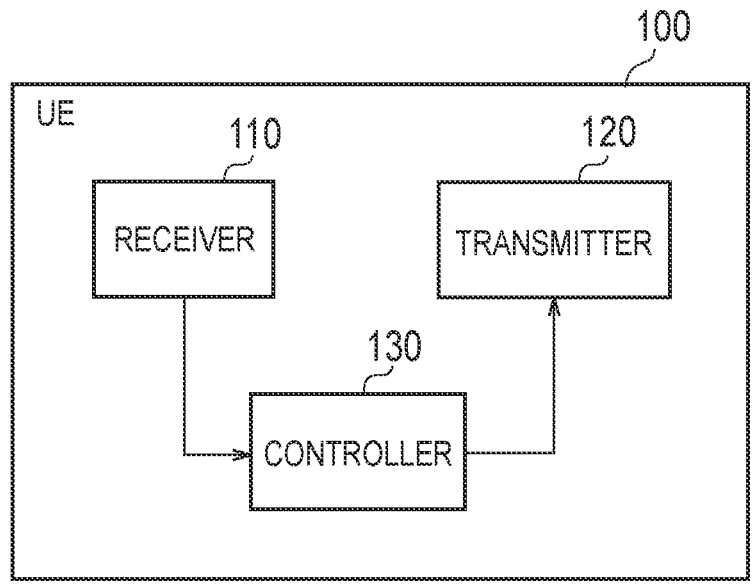
FIG. 5 is a block diagram of a user equipment (UE) 100.

The UE 100 (radio terminal) according to the embodiment will be described below. FIG. 5 is a block diagram of the UE 100. As illustrated in FIG. 5, the UE 100 comprises a receiver (Receiver: reception unit) 110, a transmitter (Transmitter: transmission unit) 120, and a controller (Controller: control unit) 130. The receiver 110 and the transmitter 120 may be unified as one in the form of a transceiver (transmission and reception unit).

The receiver 110 performs various types of reception under the control of the controller 130. The receiver 110 comprises an antenna. The receiver 110 converts a radio signal received by the antenna, into a baseband signal (reception signal), and outputs the baseband signal to the controller 130.

In addition, if the UE 100 is "ProSe-enabled Public Safety UE", the receiver 110 can simultaneously receive radio signals in two different frequencies. For example, the UE 100 comprises two receivers 110 (2 RX Chain). The UE 100 can receive a radio signal for cellular using one receiver 110, and can receive a radio signal for the ProSe using the other receiver 110.

The transmitter 120 performs various types of transmission under the control of the controller 130. The transmitter 120 comprises an antenna. The transmitter 120 converts a baseband signal (transmission signal) output by the controller 130, into a radio signal, and transmits the radio signal from the antenna.

The controller 130 performs various types of control in the UE 100. The controller 130 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor may comprise a codec that performs encoding/decoding of an audio/video signal. The processor executes various types of processing to be described later and various types of communication protocols mentioned above.

The UE 100 may comprise a GNSS receiver. The GNSS receiver receives the GNSS signal and outputs the received signal to the controller 130 to obtain location information indicating the geographical location of the UE 100. Alternatively, the UE 100 may have a GPS function for acquiring the location information of the UE 100.

(Base Station)

Figure 6:
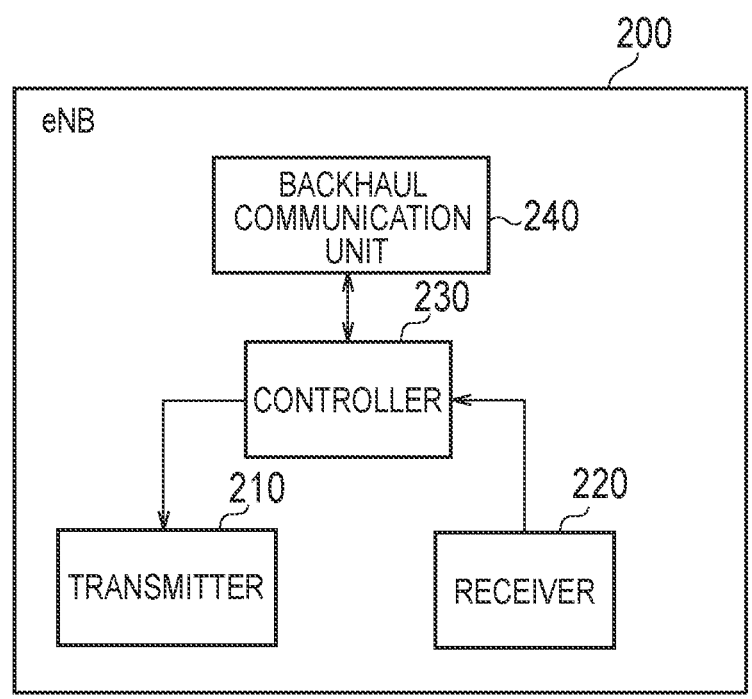
FIG. 6 is a block diagram of an evolved Node-B (eNB) 200.

The eNB 200 (base station) according to the embodiment will be described below. FIG. 6 is a block diagram of the eNB 200. As illustrated in FIG. 6, the eNB 200 comprises a transmitter (Transmitter: transmission unit) 210, a receiver (Receiver: reception unit) 220, a controller (Controller: control unit) 230, and a backhaul communication unit 240.

The transmitter 210 performs various types of transmission under the control of the controller 230. The transmitter 210 comprises an antenna. The transmitter 210 converts a baseband signal (transmission signal) output by the controller 230, into a radio signal, and transmits the radio signal from the antenna.

The receiver 220 performs various types of reception under the control of the controller 230. The receiver 220 comprises an antenna. The receiver 220 converts a radio signal received by the antenna, into a baseband signal (reception signal), and outputs the baseband signal to the controller 230.

The controller 230 performs various types of control in the eNB 200. The controller 230 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor executes various types of processing to be described later and various types of communication protocols mentioned above.

The backhaul communication unit 240 is connected to a neighboring eNB 200 via an X2 interface and is connected to a MME/S-GW 300 via an S1 interface. The backhaul communication unit 240 is used for communication performed on the X2 interface, communication performed on the S1 interface, and the like.

(Operation Environment According to Embodiment)

Figure 7:
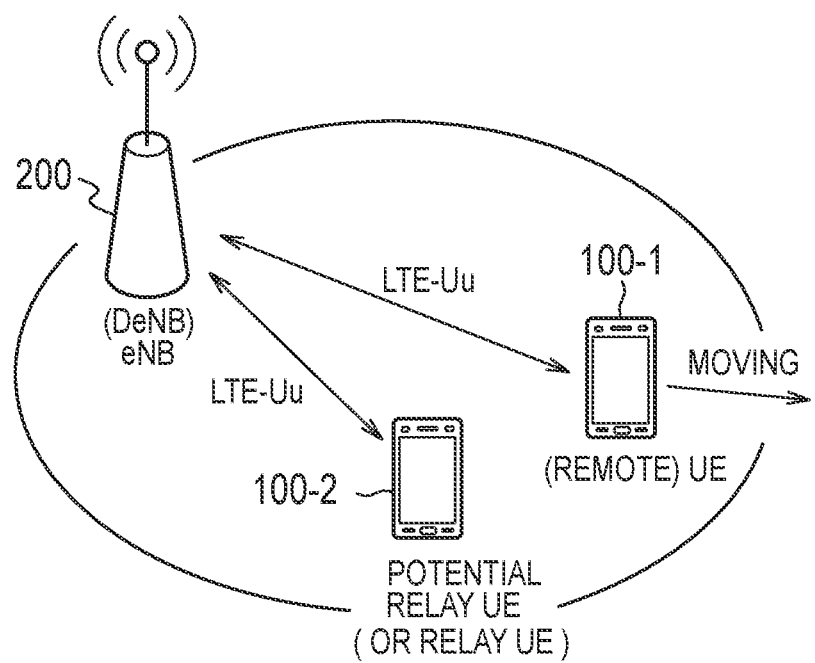
FIG. 7 is a diagram for describing an operation environment according to the embodiment.

Next, an operation environment according to the embodiment will be described by using FIG. 7. FIG. 7 is a diagram for describing an operation environment according to the embodiment.

As illustrated in FIG. 7, the UE 100-1 is located within a cell managed by the eNB 200 (DeNB: Donor eNB). The UE 100-1 can execute cellular communication (LTE-Uu) with the eNB 200. The UE 100-1 is in the RRC connected state. Alternatively, the UE 100-1 may be in the RRC idle state. Upon performing communication with the eNB 200, the UE 100-1 may shift to the RRC connected state from the RRC idle state.

The UE 100-1 moves towards outside of the cell. The UE 100-1 can be the remote UE, upon being located outside the coverage of the cell.

The UE 100-2 is located within the cell managed by the eNB 200. The UE 100-2 can execute cellular communication (LTE-Uu) with the eNB 200. The UE 100-2 is in the RRC connected state. Alternatively, the UE 100-2 may be in the RRC idle state. Upon performing communication with the eNB 200, the UE 100-2 may shift to the RRC connected state from the RRC idle state.

The UE 100-2 is the relay UE in an operation example 1 described later. In this case, the UE 100-2 establishes a UE-to-Network relay connection between the eNB 200 and the relay UE.

On the other hand, the UE 100-2 in operation examples 2 to 4 described later is not the relay UE in an initial state. The UE 100-2 is a UE that can be the relay UE (Potential Relay UE). The UE 100-2 has a capability of functioning as a relay UE.

(Operation According to Embodiment)

Next, operations according to the embodiment will be described. Specifically, the operations according to the embodiment will be described by taking the following operation examples 1 to 4 as examples.

It is noted that the below-described process (operation) executed by the UE 100 is executed by at least any one of the receiver 110, the transmitter 120, and the controller 130 included in the UE 100, however, it is described as a process executed by the UE 100 for the purpose of convenience. Similarly, the below-described process (operation) executed by the eNB 200 is executed by at least any one of the transmitter 210, the receiver 220, the controller 230, the backhaul communication unit 240 included in the eNB 200, however, it is described as a process executed by the eNB 200 for the purpose of convenience.

The operation example 1 is a case where the relay UE is present in the vicinity of (in the proximity of) the UE 100-1. On the other hand, the operation examples 2 to 4 are cases where the relay UE is not present in the vicinity of (in the proximity of) the UE 100-1.

(1) Operation Example 1

Figure 8:
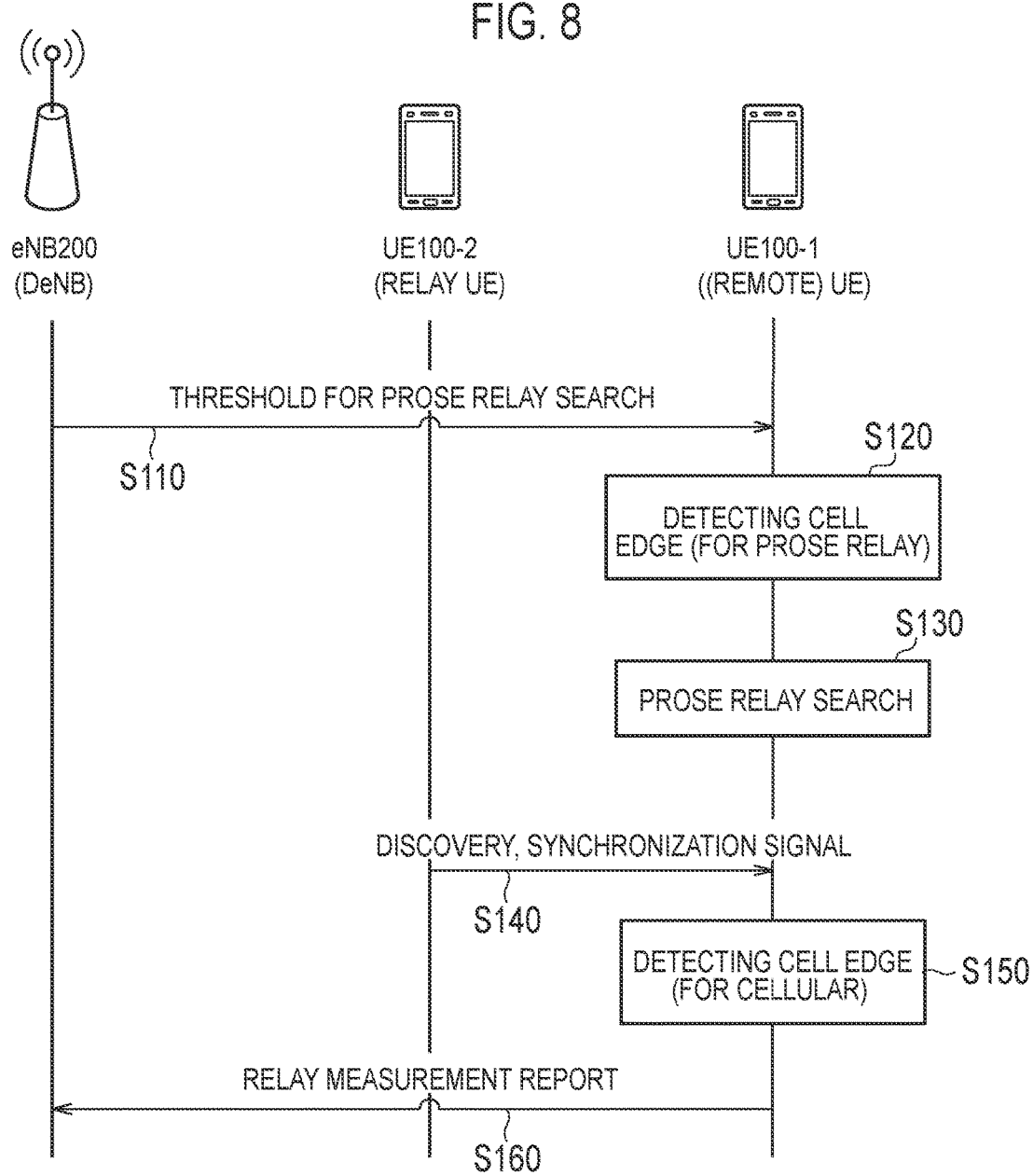
FIG. 8 is a diagram for describing an operation example 1 according to the embodiment.

The operation example 1 according to the embodiment will be described by using FIG. 8. FIG. 8 is a diagram for describing the operation example 1 according to the embodiment.

As illustrated in FIG. 8, in step S110, the eNB 200 transmits to the UE 100-1 a threshold value (hereinafter, a first threshold value) that serves as a measurement trigger for a signaling transmitted by the relay UE. The eNB 200 may transmit, to the UE 100-1, the first threshold value by broadcast (for example, SIB), or may transmit, to the UE 100-1, the first threshold value by an individual signaling (dedicated signaling). The UE 100 sets the first threshold value received from the eNB 200.

Further, the eNB 200 may transmit, to the UE 100-1, a threshold value that serves as a report trigger for a measurement result of the signaling transmitted by the relay UE (hereinafter, a second threshold value). Values of the first threshold value and the second threshold value may be equal to each other or different from each other (for example, "first threshold value≥second threshold value"). The second threshold value may be an A1 trigger threshold value. If a reception level of a reference signal from the serving cell exceeds the A1 trigger threshold value (the second threshold value), the UE 100-1 transmits the measurement report.

In step S120, the UE 100-1 detects, based on the first threshold value, that the UE 100-1 is located at the cell edge. Specifically, if a radio signal from the eNB 200 (cell) falls below the first threshold value, the UE 100-1 detects that the UE 100-1 is located at the cell edge. Upon detecting, based on the first threshold value, that the UE 100-1 is located at the cell edge, the UE 100-1 executes the process in step S130.

In step S130, the UE 100-1 starts searching the relay UE. Specifically, the UE 100-1 starts measurement (monitoring) of the signaling transmitted by the relay UE.

In step S140, the UE 100-2 transmits each of a discovery signal and a synchronization signal. In the present specification, the synchronization signal is a radio signal related to synchronization. The synchronization signal may include not only a radio signal (SLSS: Sidelink Synchronisation Signal) for establishing synchronization in the ProSe, but also a radio signal including a "MasterInformationBlock-SL" message. It is noted that, the radio signal (SLSS) includes a primary synchronization signal (P-SLSS: Primary-SLSS) and a secondary synchronization signal (S-SLSS: Secondary-SLSS).

In order to notify a relationship between the discovery signal and the synchronization signal to be transmitted, the UE 100-2 may notify, by the discovery signal, an identifier indicating the relationship with the synchronization signal (SLSS). This identifier may be a synchronization signal identifier used for a synchronization signal transmission. The UE 100-2 may include this identifier into the discovery signal (discovery message).

Alternatively, the UE 100-2 may notify, by the "MasterInformationBlock-SL" message, that the UE-to-Network relay is being carried out. In this case, the "MasterInformationBlock-SL" message may include an identifier indicating a relationship between this message and the discovery signal. This identifier may be an identifier (UE ID) of the UE 100-2 notified by the discovery signal, or a part of the identifier of the 100-2.

Alternatively, the UE 100-2 may use a special identifier as an identifier (ID) used for scrambling of the discovery signal to be transmitted. This identifier may be a synchronization signal identifier (SLSS ID) utilized for the synchronization signal transmission.

The UE 100-1 performs measurement based on the signaling from the UE 100-2 (at least one of the discovery signal and the synchronization signal). For example, the UE 100-1 measures a reception level (RSRP (Reference Signal Received Power) and/or RSRQ (Reference Signal Received Quality)) of the signaling from the UE 100-2. It is noted that, if the second threshold value is not configured, the UE 100-1 may execute the process in step S160.

In step S150, the UE 100-1 detects, based on the second threshold value, that the UE 100-1 is located at the cell edge. Specifically, if the radio signal from the eNB 200 falls below the second threshold value, the UE 100-1 detects that the UE 100-1 is located at the cell edge. Upon detecting, based on the second threshold value, that the UE 100-1 is located at the cell edge, the UE 100-1 executes the process in step S160.

In step S160, the UE 100-1 reports to the eNB 200 the measurement result of the signaling transmitted by the relay UE.

It is noted that, the UE 100-1 measures the reception level (RSRP and/or RSRQ) of the reference signal from a neighbour cell, and if the measurement result is higher than a threshold value (hereinafter, third threshold value), the UE 100-1 may omit to report the measurement result of the signaling from the UE 100-2.

The eNB 200 selects, based on the measurement result, the UE 100-2 as a relay UE that relays data of the UE 100-1. The eNB 200 instructs the UE 100-2 to relay the data of the UE 100-1. Consequently, even if the UE 100-1 moves outside the coverage of the cell, the UE 100-2 can relay the data of the UE 100-1. As a result, even if moving outside the network, the UE 100-1 can continue communication with the network. The UE 100-1 can continue communication with the network more quickly compared to a case where the preparation for the UE-to-Network relay is executed after the communication between the UE 100-1 and the network becomes impossible.

(2) Operation Example 2

Figure 9:
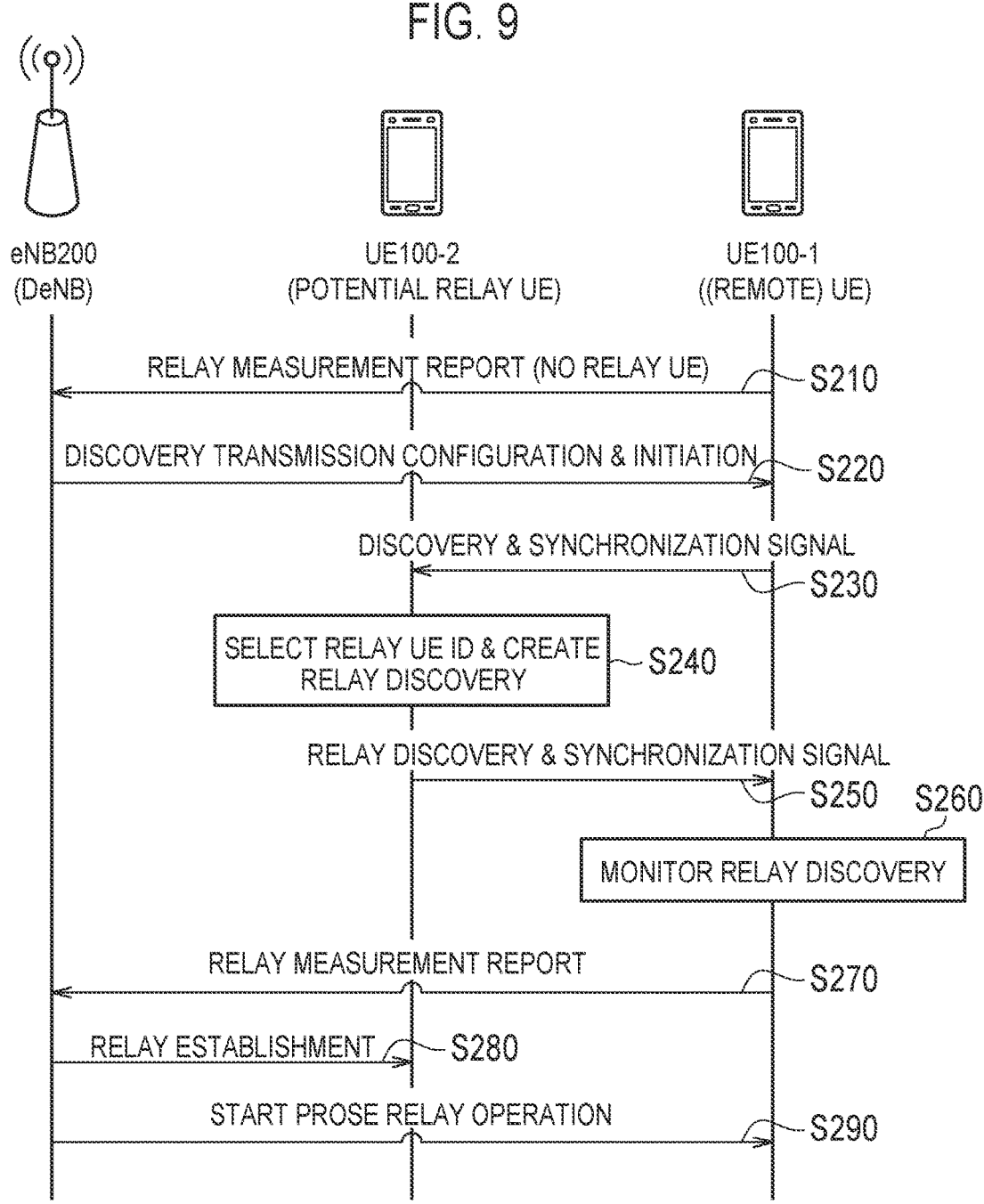
FIG. 9 is a diagram for describing an operation example 2 according to the embodiment.

The operation example 2 according to the embodiment will be described by using FIG. 9. FIG. 9 is a diagram for describing the operation example 2 according to the embodiment. A description of parts similar to the operation example 1 will be omitted.

The operation example 2 is a case where, in the operation example 1, the UE 100-1 cannot measure the signaling transmitted by the relay UE. It is noted that, as described-above, the UE 100-2 has a capability of functioning as a relay UE. However, the UE 100-2 is not the relay UE in the initial state.

As illustrated in FIG. 9, in step S210, the UE 100-1 reports to the eNB 200 the measurement result of the signaling transmitted by the relay UE. The report in step S210 corresponds to the report in step S160.

Here, the report of the measurement result is a report indicating that the relay UE is not present in the vicinity of the UE 100-1, and, for example, the UE 100-1 includes information indicating that the signaling transmitted by the relay UE could not be received.

The eNB 200 recognizes, based on the report, that the relay UE is not present in the vicinity of the UE 100-1.

In step S220, if the relay UE is not present in the vicinity of the UE 100-1, in order to discover the UE that can be the relay UE (Potential Relay UE), the eNB 200 transmits, in response to reception of the report in step S210, control information for starting transmission of the discovery signal (Discovery transmission configuration & initiation).

The control information may include at least any one of information on a transmission resource pool (used only for discovering another UE that can be the relay UE), information on transmission power of the discovery signal, information for transmitting, in a period of transmitting the discovery signal, a synchronization signal (a signal related to synchronization) in the proximity service, and information for designating an application code used for the discovery signal.

The UE 100-1 performs, based on the control information, configuration for transmitting the discovery signal.

In step S230, the UE 100-1 starts transmitting the discovery signal. The discovery signal may be a discovery signal dedicated to discovering the UE that can be the relay UE.

If the control information includes a transmission resource pool, the UE 100-1 uses a radio resource within the transmission resource pool to transmit the discovery signal. The transmission resource pool may be a resource pool used only for discovering another UE that can be the relay UE.

If the control information includes information on transmission power of the discovery signal, the UE 100-1 transmits the discovery signal by the transmission power based on the information.

For example, the information may be information indicating a discovery range (any one of Large, Middle, or Small) that defines a range of the transmission power. Alternatively, the information may indicate a direct value of the transmission power.

If the control information includes information for transmitting the synchronization signal, the UE 100-1 also transmits the synchronization signal in the period of transmitting the discovery signal. It is noted that, as described above, the synchronization signal is a radio signal related to synchronization, and may include not only the radio signal (SLSS) for establishing synchronization in the ProSe, but also the radio signal including a "MasterInformationBlock-SL" message.

Further, in order to notify a relationship between the discovery signal and the synchronization signal to be transmitted, the UE 100-1 may notify, by the discovery signal, an identifier indicating the relationship with the synchronization signal (SLSS). This identifier may be a synchronization signal identifier used for a synchronization signal transmission. The UE 100-1 may include this identifier into the discovery signal (discovery message).

Alternatively, the UE 100-1 may notify, by the "MasterInformationBlock-SL" message, that the UE 100-1 transmits the discovery signal to discover the UE that can be the relay UE. In this case, the "MasterInformationBlock-SL" message may include an identifier indicating a relationship between this message and the discovery signal. This identifier may be an identifier (UE ID) of the UE 100-1 notified by the discovery signal, or a part of the identifier of the UE 100-1.

Alternatively, the UE 100-1 may use a special identifier as an identifier (ID) used for scrambling of the discovery signal to be transmitted. This identifier may be a synchronization signal identifier (SLSS ID) utilized for the synchronization signal transmission.

The information for transmitting the synchronization signal may include an identifier to be included into the synchronization signal. This identifier may be an identifier dedicated to the synchronization signal. Upon transmitting the synchronization signal, the UE 100-1 includes the identifier.

If the control information includes information for designating the application code used for the discovery signal, the UE 100-1 transmits the discovery signal by using the designated application code.

The UE 100-2 that monitors the discovery signal receives the discovery signal from the UE 100-1. The UE 100-2 executes the process in step S240, upon succeeding in receiving the discovery signal. The UE 100-2 may execute the process in step S240, if the UE 100-2 can be the relay UE.

In step S240, the UE 100-2 selects a relay UE identifier. Here, the UE 100-2 generates the discovery signal including the selected relay UE identifier. Unlike a normal discovery signal, this discovery signal may be a special discovery signal (Relay discovery signal) transmitted by the UE that can be the relay UE. Even if receiving the special discovery signal, the remote UE which is outside the coverage does not recognize that the special discovery signal is transmitted from the relay UE.

The UE 100-2 transmits to the eNB 200 the selected relay UE identifier. Alternatively, after executing the process in step S250, the UE 100-2 transmits to the eNB 200 the selected relay UE identifier.

Further, the UE 100-2 may request the eNB 200 or a network apparatus to assign the relay UE identifier to be included into the discovery signal, without selecting the relay UE identifier. The UE 100-2 generates the discovery signal including the relay UE identifier assigned from the eNB 200 or the network apparatus. It is noted that, the network apparatus is, for example, a Server 400 configured to manage an identifier used in an MME 300 or the ProSe. The relay UE identifier may be an identifier that is temporarily utilized, or may be an identifier that is changed if the UE 100-2 becomes (or has become) the relay UE.

In step S250, the UE 100-2 starts transmitting the generated discovery signal. The UE 100-2 may transmit not only the discovery signal, but also the synchronization signal.

Further, the discovery signal may include information indicating that the UE-to-Network relay connection (PDN (Packet Data Network) connection (EPS (Evolved Packet System) bearer)) is not established between the UE 100-2 and the eNB 200. The remote UE which is outside the coverage may not be recognized as the relay UE, based on the information.

Further, upon transmitting the synchronization signal, the UE 100-2 may utilize a synchronization signal identifier (SLSS ID) which is used by the UE 100-1 and received in step S230. That is, the UE 100-2 may transmit the synchronization signal including the synchronization signal identifier (SLSS ID) used by the UE 100-1. Alternatively, the UE 100-2 may utilize a synchronization signal identifier (SLSS ID) which is newly generated based on the synchronization signal identifier (SLSS ID) used by the UE 100-1.

In step S260, the UE 100-1 performs monitoring of the discovery signal. Here, the UE 100-1 may perform monitoring of the special discovery signal. Further, the UE 100-1 may execute measurement of the synchronization signal. Specifically, the UE 100-1 measures the reception level (RSRP and/or RSRQ) of the synchronization signal. Upon receiving the synchronization signal in which a synchronization signal identifier used by the UE 100-1 (or a synchronization signal identifier generated based on the synchronization signal identifier used by the UE 100-1) is included, the UE 100-1 may measure the reception level of the synchronization signal.

In step S270, the UE 100-1 transmits to the eNB 200 a report indicating whether or not the UE that can be the relay UE is discovered. Specifically, upon receiving the discovery signal from the UE 100-2, the UE 100-1 transmits to the eNB 200 a report (Relay measurement report) indicating that the UE that can be the relay UE is discovered. The UE 100-1 may include, into the report, information indicating the reception level of the synchronization signal (measurement result).

The eNB 200 selects, based on the report from the UE 100-1, the UE 100-2 as a relay UE that relays the data of the UE 100-1. Alternatively, if the report includes the information indicating the reception level, the eNB 200 determines, based on the information indicating the reception level, whether or not to start establishing the UE-to-Network relay connection between the eNB 200 and the UE 100-2. That is, the eNB 200 may determine, based on the information indicating the reception level, whether or not the UE 100-2 is to be the relay UE that relays the data of the UE 100-1 (that is, whether or not to select the UE 100-2 as the relay UE). If the reception level is equal to or more than the threshold value, the eNB 200 may select the UE 100-2 as the relay UE. Otherwise, the eNB 200 may execute the process in step S220. Upon selecting the UE 100-2 as the relay UE, the eNB 200 executes the process in step S280.

In step S280, establishing the UE-to-Network relay connection between the eNB 200 and the UE 100-2 is started. Specifically, the eNB 200 transmits, to the UE 100-2, information for establishing the UE-to-Network relay connection (relay UE configuration information). The UE 100-2 establishes, based on the information, the UE-to-Network relay connection. Consequently, the UE 100-2 functions as the relay UE.

In step S290, after establishing the UE-to-Network relay connection, the eNB 200 transmits to the UE 100-1 a notification to inform that the relay service can be utilized. The notification may be information for stating the relay service. The UE 100-1 may start, in response to reception of the information, utilizing the relay service. Alternatively, upon being located within the cell, the UE 100-1 may perform the cellular communication without utilizing the relay service, and upon moving outside the cell, the UE 100-1 may start utilizing the relay service.

Thus, in the initial state, even if the relay UE is not present in the vicinity of the UE 100-1, the UE that can be the relay UE is established as the relay UE, so that the UE-to-Network relay can be utilized effectively.

(3) Operation Example 3

Figure 10:
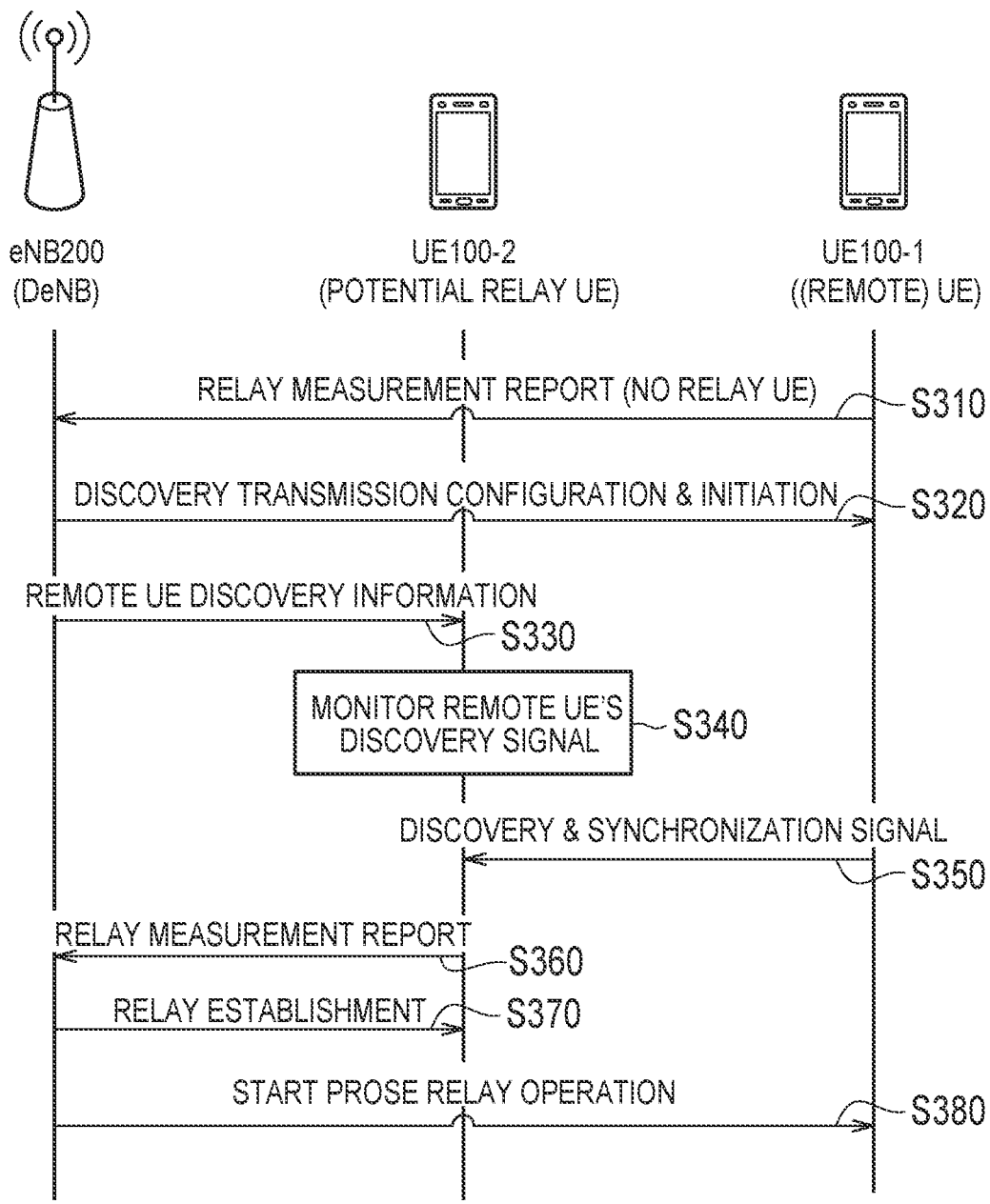
FIG. 10 is a diagram for describing an operation example 3 according to the embodiment.

An operation example 3 according to the embodiment will be described by using FIG. 10. FIG. 10 is a diagram for describing the operation example 3 according to the embodiment. A description of parts similar to the operation example 1 and the operation example 2 will be omitted.

In the operation example 2, the UE 100-1 that can be the remote UE transmits the report to the eNB 200 (see step S270). In the operation example 3, the UE 100-2 that can be the relay UE transmits the report to the eNB 200 (see step S360).

In FIG. 10, steps S310 and S320 correspond to steps S210 and S220.

In step S330, the eNB 200 transmits, to the UE 100-2 that can be the relay UE, second control information (Remote UE discovery information) for starting reception of the discovery signal. The eNB 200 may include, into the second control information, at least some pieces of information included in the control information in step S320. The eNB 200 may use broadcast (for example, SIB) to transmit the second control information to the UE 100-2, or may use an individual signaling to transmit the second control information to the UE 100-2. If a UE has already notified the eNB 200 of information indicating the capability of functioning as the relay UE, the eNB 200 may transmit the second control information to the UE.

In step S340, the UE 100-2 starts receiving (monitoring) the discovery signal in response to reception of the second control information. For example, if the control information includes the transmission resource pool in the second control information, the UE 100-2 performs monitoring of the transmission resource pool as a target. Further, if the second control information includes the identifier of the UE 100-1, the UE 100-1 performs monitoring of the discovery signal including the identifier of the UE 100-1, as a target.

Step S350 corresponds to step S230.

The UE 100-2 that monitors the discovery signal receives the discovery signal from the UE 100-1. The UE 100-2 executes the process in step S360, upon succeeding in receiving the discovery signal. The UE 100-2 may execute the process in step S360, if the UE 100-2 can be the relay UE.

Further, the UE 100-2 may measure the reception level (RSRP and/or RSRQ) of the synchronization signal from the UE 100-1.

In step S360, the UE 100-2 transmits, to the eNB 200, a report (Relay measurement report) indicating whether or not the UE 100-1 is discovered. Specifically, upon receiving the discovery signal from the UE 100-2, the UE 100-2 transmits to the eNB 200 the report indicating that the UE is discovered. The UE 100-1 may include, into the report, information indicating the reception level of the synchronization signal (measurement result).

The eNB 200 selects, based on the report from the UE 100-2, the UE 100-2 as the relay UE that relays the data of the UE 100-1. Alternatively, if the report includes the information indicating the reception level, the eNB 200 may determine, based on the information indicating the reception level, whether or not to select the UE 100-2 as the relay UE. The determination method is similar to the one in the above-described step S270.

Steps S370 and S380 correspond to steps S280 and S290.

Thus, in the initial state, even if the relay UE is not present in the vicinity of the UE 100-1, the UE that can be the relay UE is established as the relay UE, so that the UE-to-Network relay can be utilized effectively. Further, the UE 100-2 can omit the process to transmit the discovery signal, so that the relay service can become available quickly.

(4) Operation Example 4

Figure 11:
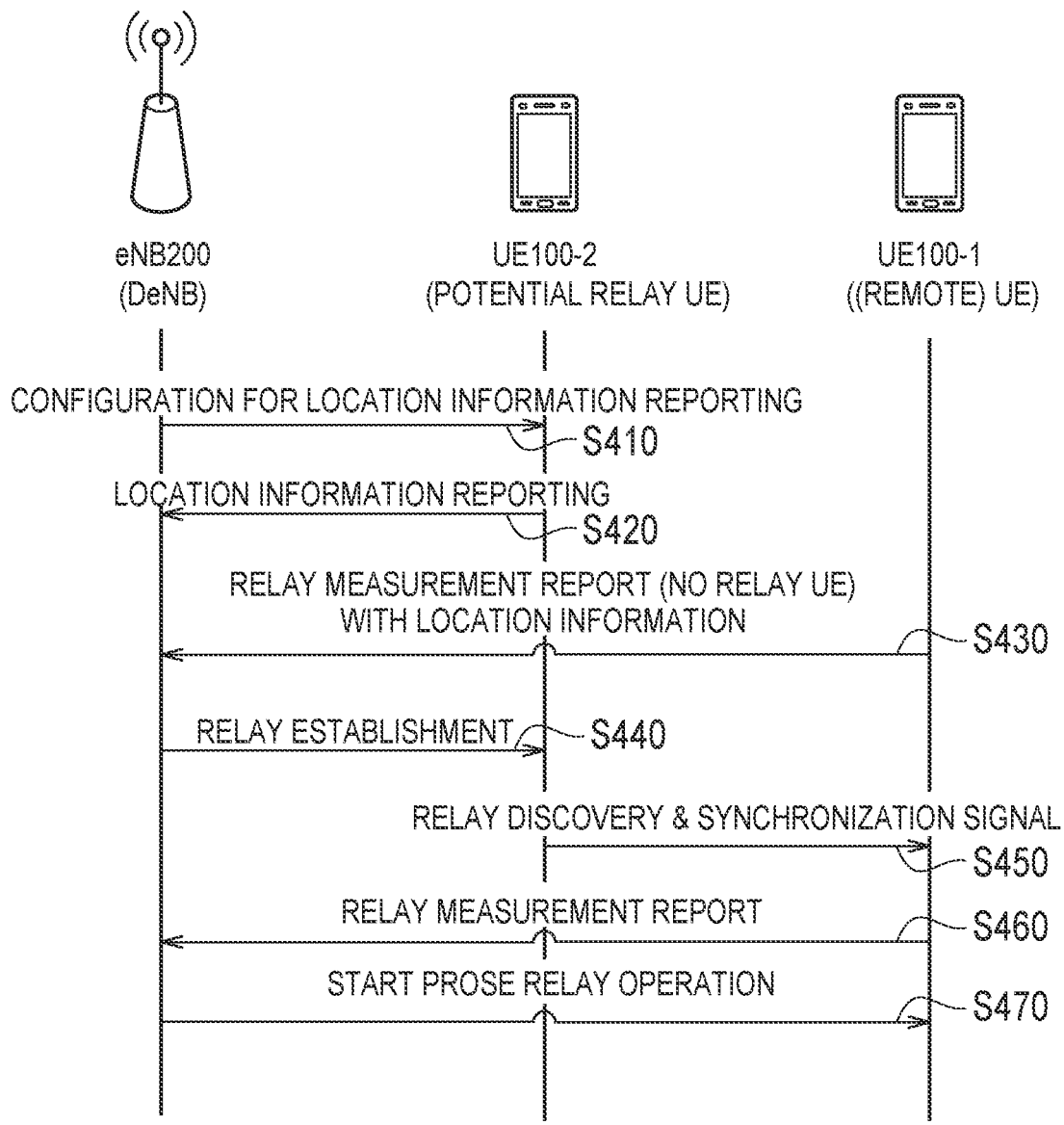
FIG. 11 is a diagram for describing an operation example 4 according to the embodiment.

The operation example 4 according to the embodiment will be described by using FIG. 11. FIG. 11 is a diagram for describing the operation example 4 according to the embodiment. A description of parts similar to the operation example 1 to the operation example 3 will be omitted.

The operation example 4 determines, based on location information, whether or not to select the UE 100-2 as the relay UE.

As illustrated in FIG. 11, in step S410, the eNB 200 transmits, to the UE 100-2, configuration information by which the UE 100-2 that can be the relay UE reports the location information (Configuration for location information reporting). If a UE has already notified the eNB 200 of information indicating the capability of functioning as the relay UE, the eNB 200 may transmit the control information to the UE. Alternatively, the eNB 200 may transmit, to each UE 100 within the cell of the eNB 200, configuration information such that only the UE that can be the relay UE reports the location information.

The UE 100-2 performs configuration, based on the configuration information. Further, the UE 100-2 acquires the location information of the UE 100-2, for example, based on the GNSS receiving equipment or the GPS function.

In step S420, the UE 100-2 reports to the eNB 200 the location information of the UE 100-2.

In step S430, the UE 100-1 transmits to the eNB 200 a report indicating that the relay UE is not present in the vicinity of the UE 100-1. The UE 100-1 includes the location information of the UE 100-1 into the report.

It is noted that, although the report in step S430 corresponds to the report in step S210, the report in step S430 differs in that the location information of the UE 100-1 is included therein.

The eNB 200 selects, in response to reception of the report, the UE to be the relay UE that relays the data of the UE 100-1 from among UE(s) that can be the relay UE. Specifically, the eNB 200 determines, based on the location information of the UE 100-1 and the location information of the UE 100-2, whether or not the UE 100-2 is to be the relay UE that relays the data of the UE 100-1. If the difference between the location of the UE 100-1 and the location of the UE 100-2 is less than a threshold value, the eNB 200 determines that the UE 100-2 is to be the relay UE.

Step S440 corresponds to step S280. The eNB 200 may transmit to the UE 100-2 control information for starting transmission of the discovery signal. Here, the control information may include information similar to the information in step S220.

Steps S450 and S460 correspond to steps S250 and S270.

The eNB 200 receives, from the UE 100-1, a report indicating whether or not the UE 100-2 is discovered. The eNB 200 may determine, based on the report, whether or not to cause the UE 100-2 to relay the data of the UE 100-1. Upon receiving a report indicating that the UE 100-2 is discovered, the eNB 200 determines to cause the UE 100-2 to relay the data of the UE 100-1. Alternatively, if the report includes the information indicating the reception level, the eNB 200 may determine, based on the information indicating the reception level, whether or not to cause the UE 100-2 to relay the data of the UE 100-1.

If the eNB 200 determines to cause the UE 100-2 to relay the data of the UE 100-1, the eNB 200 executes the process in step S470. If the eNB 200 determines not to cause the UE 100-2 to relay the data of the UE 100-1, the eNB 200 may transmit to the UE 100-2 the control information for starting transmission of the discovery signal (see step S440).

Step S470 corresponds to step S290. It is noted that, the eNB 200 may execute the process in step S470, after executing the process in step S440. That is, the processes in steps S450 and S460 may be omitted.

Thus, in the initial state, even if the relay UE is not present in the vicinity of the UE 100-1, the UE that can be the relay UE is established as the relay UE, so that the UE-to-Network relay can be utilized effectively.

Other Embodiments

In the above-described embodiment, a case where the relay UE is not present in the vicinity of the UE 100-2 is described as an example; however the present embodiment is not limited thereto. Even in a case where the relay UE is present in the vicinity of the UE 100-2, the relay UE may terminate executing the UE-to-Network relay, shortly. In this case, the UE 100-2 may also make a report indicating that the relay UE is not present nearby. Alternatively, instead of making a report indicating that the relay UE is not present nearby, the UE 100-2 may perform reporting indicating that the relay UE is not present in the vicinity. It is noted that, upon receiving, by the relay UE, information on termination of executing the UE-to-Network relay, the UE 100-2 may find out that the relay UE terminates executing the UE-to-Network relay. The information is, for example, information indicating remaining time and/or termination time of executing the UE-to-Network relay. The relay UE starts transmitting the information, for example, if the battery remaining amount falls under the threshold value.

Further, in the above-described embodiment (operation example 3), in step S340, the UE 100-2 may add, to the monitoring, the discovery signal and the synchronization signal transmitted by the UE 100-1, and start monitoring of the discovery signal and the synchronization signal transmitted by the relay UE, in order to determine whether or not the relay UE is present in the vicinity of the UE 100-2.

In this case, in step S360, the UE 100-2 may report, to the eNB 200, not only a monitoring result of the discovery signal and the synchronization signal transmitted by the UE 100-1, but also a monitoring result of the discovery signal and the synchronization signal transmitted by the relay UE. The eNB 200 may adjust, based on the monitoring result of the discovery signal and the synchronization signal transmitted by the relay UE, relay UE configuration information which is configured when the UE 100-2 is established as the relay UE. For example, the eNB 200 can configure a resource pool different from the resource pool used by the relay UE that is present in the vicinity of the UE 100-2, or set, to the UE 100-2, a synchronization signal identifier different from the synchronization signal identifier used by the relay UE that is present in the vicinity of the UE 100-2. Thus, the eNB 200 may perform adjustment to prevent interference between the relay UEs.

In the above-described embodiment, each operation in the operation example 2 to the operation example 4 may be combined and implemented where necessary. For example, in the operation example 2, the eNB 200 may transmit, to the UE 100-2, the second control information in step S330. The UE 100-2 may start, based on the second control information, receiving (monitoring) the signaling in step S230. Alternatively, in the operation example 4, a series of operations (steps S220 to S270) in the operation example 2 may be executed instead of the operations in steps S450 and S460, or a series of operations (steps S330 to S360) in the operation example 3 may be executed. In this way, each operation in the operation example 2 to the operation example 4 can be executed by combining where appropriate.

In the above-described embodiment, if the relay UE is not present in the vicinity of the UE 100-1, the discovery signal is described as an example of a signal transmitted, based on the control signal, by the UE 100-1, however, another radio signal in the Sidelink may be used. For example, the UE 100-1 may transmit a control message in the Sidelink. Specifically, the UE 100-1 may transmit a PC5 control message in direct communication. Therefore, the discovery signal (or the discovery message) in the above-described embodiment can be replaced with the control signal (or the control message) where appropriate.

In the above-described embodiment, an LTE system has been described as an example of a mobile communication system; however, the mobile communication system is not limited to the LTE system, and the present application may be applied to a system other than the LTE system.

[Additional Statement]

In this additional statement, the mechanisms to establish the ProSe Relay UE are further discussed.

(1) Discussion (1.1) Establishment of ProSe Relay UE

Figure 12:
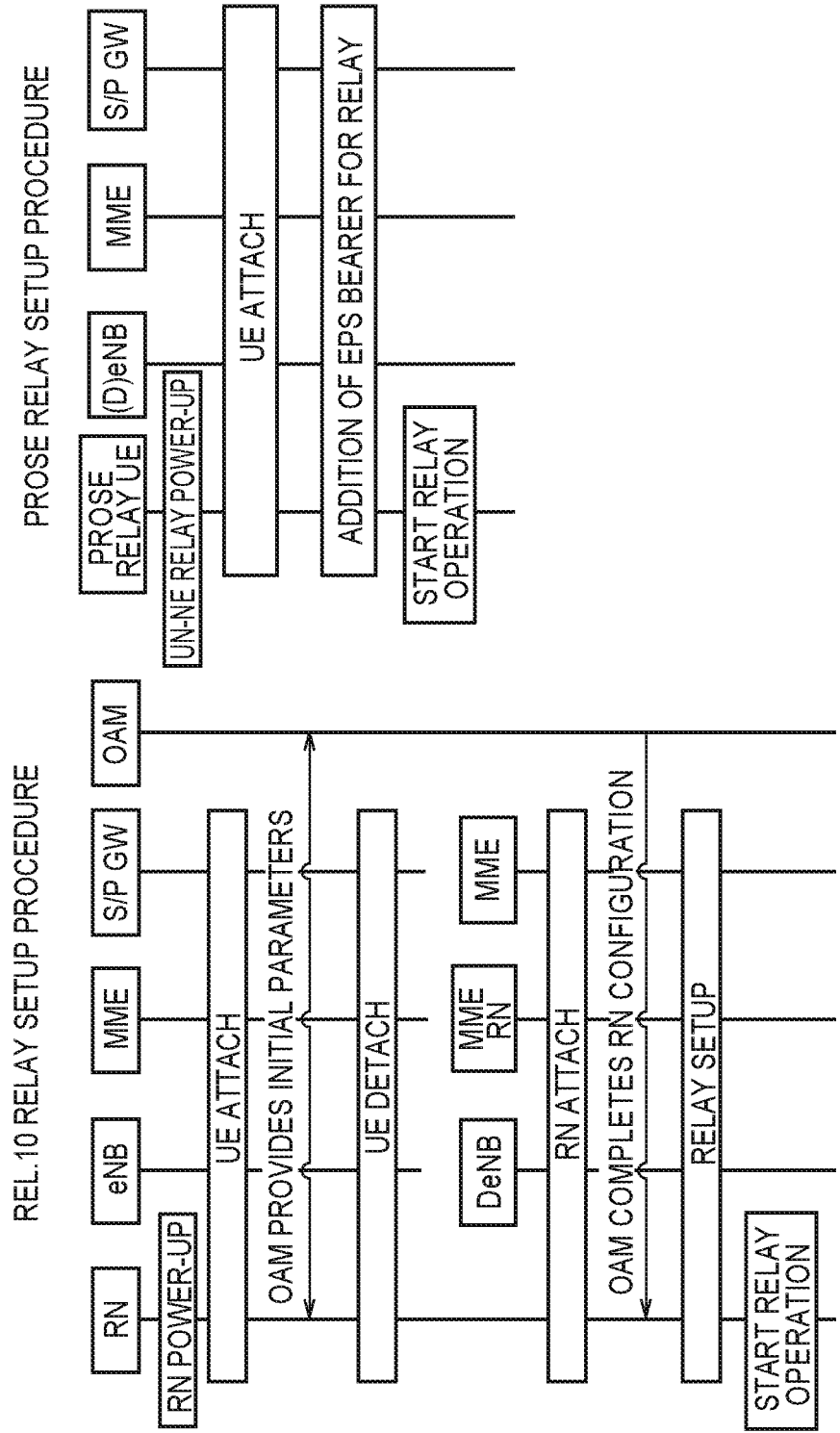
FIG. 12 is a diagram for describing a ProSe UE-to-Network relay setup procedure.

As shown in FIG. 12, regarding the establishment procedure of Rel-10 Relay, the RN attaches to the E-UTRAN/EPC as a UE to retrieve the initial configuration parameter from RN OAM, and then the RN detaches as a UE, and finally the RN attaches as the RN, establishes Un interface and initiates the Relay operation. On the other hand, for the ProSe UE-to-Network Relay, the connection between ProSe Relay UE and (D)eNB is established over Uu interface, therefore, it's not necessary to apply current Relay establishment procedure to ProSe Relay UE. As for the establishment procedure of ProSe UE-to-Network Relay, the (D)eNB can add the radio bearer of Relay operation to UE-to-Network Relay.

Observation 1: For the ProSe UE-to-Network Relay, the connection between ProSe Relay UE and (D)eNB is established over Uu interface.

Proposal 1: Proposal 1: The establishment of ProSe UE-to-Network Relay should be initiated by adding the DRB of ProSe UE-to-Network Relay operation to ProSe Relay UE.

(1.2) Establishment Mechanism Triggered by Remote UE's Request

The ProSe Relay UE needs to keep announcing relay discovery to provide the ProSe Relay operation to Remote UE. However, if the ProSe Relay UE doesn't serve any Remote UE, it's not worth for ProSe Relay UE to keep announcing relay discovery in the perspective of ProSe Relay UE's workload. Therefore, ProSe Relay UE should be established when the ProSe Relay UE is in proximity with the Remote UE requiring ProSe Relay operation. For the case when the Remote UE desires ProSe Relay operation but can't detect any ProSe Relay UE, further discussion is needed.

Proposal 2: The ProSe Relay UE should stop relay discovery announcements when it no longer serves any Remote UEs.

At first, the case when the Remote UE is out of network coverage would be discussed. In this case, the potential ProSe Relay UE which is either in RRC_CONNECTED or in RRC_IDLE, needs to receive the request of ProSe Relay operation (Relay request) directly from the Remote UE. This kind of request can be the relay discovery (e.g. Model B). Additionally, the potential ProSe Relay UE needs to indicate to the (D)eNB the request to serve as the ProSe Relay UE based on the request from the Remote UE (FIG. 13).

Figure 13:
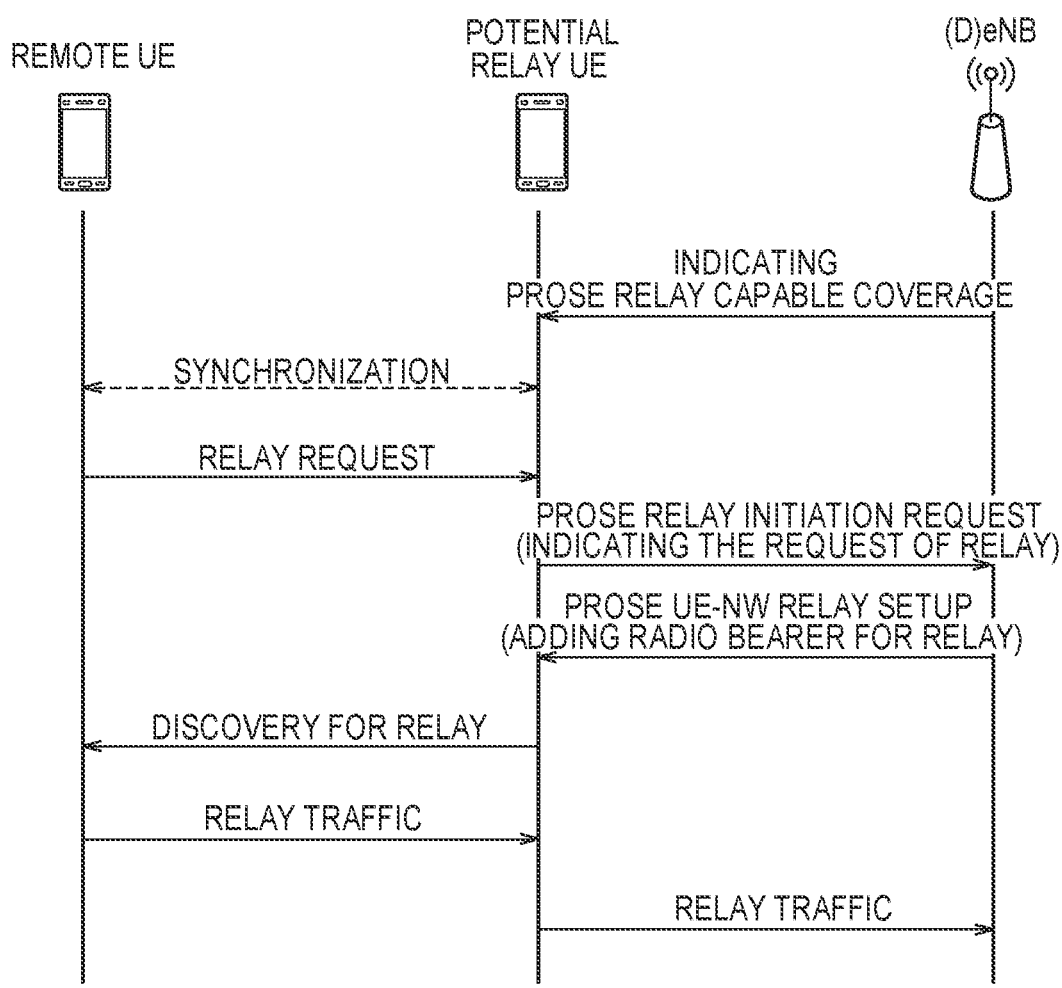
FIG. 13 is a diagram for describing a ProSe UE-to-Network relay procedure started by a remote UE which is outside a network (OoC: Out of Coverage).

For example, as shown in FIG. 13, the (D)eNB transmits information indicating the ProSe relay capable coverage. A potential ProSe relay UE receives the information.

The potential ProSe relay UE and the remote UE may be synchronized. The remote UE transmits a relay request to the potential ProSe relay UE. The potential ProSe relay UE receives the relay request.

The potential ProSe relay UE transmits a ProSe relay initiation request (information indicating the relay request of relay) to the (D)eNB. The (D)eNB receives the information.

The (D)eNB transmits information (information for adding a radio bearer for relay) for setting up the ProSe UE-to-network relay to the potential ProSe relay UE. The potential ProSe relay UE receives the information.

The potential ProSe relay UE transmits a discovery signal (relay discovery) for relay to the remote UE. The remote UE receives the discovery signal.

The remote UE transmits relay traffic (data) to the potential ProSe relay UE (ProSe UE-to-network relay). The potential ProSe relay UE (ProSe UE-to-network relay) receives the relay traffic and transmits the relay traffic to the (D)eNB. The (D)eNB receives the relay traffic.

Secondly, for the case when the Remote UE is still in network coverage the Remote UE can directly indicate to (D)eNB that the Remote UE requires ProSe Relay operation but it is not in proximity with any of the already established ProSe Relay UEs. However, the (D)eNB doesn't know the location of the potential ProSe Relay UE relative to that of the Remote UE, so the (D)eNB doesn't know which potential ProSe Relay UE should be selected as ProSe Relay UE. Therefore, (D)eNB will configure the transmission resource (pool) for relay request to Remote UE and then the Remote UE will initiate the relay request. Additionally, the potential ProSe Relay UE indicates to the (D)eNB the request to serve as the ProSe Relay UE based on the request from the Remote UE, and then (D)eNB will be able to establish the ProSe Relay UE accordingly (FIG. 14).

For example, as shown in FIG. 14, a (D)eNB transmits information indicating Prose relay capable coverage. A potential ProSe relay UE receives the information. The remote UE receives the information.

The remote UE transmits a relay request (the ProSe relay UE is not in the vicinity) to the (D)eNB. The (D)eNB transmits the transmission configuration of the relay request to the remote UE.

The potential ProSe relay UE and the remote UE may be synchronized. The remote UE transmits a relay request to the potential ProSe relay UE. The potential ProSe relay UE receives a relay request.

The potential ProSe relay UE transmits a ProSe relay initiation request (information indicating the request of relay) to the (D)eNB. The (D)eNB receives the information.

The potential ProSe relay UE (ProSe UE-to-network relay) transmits a discovery signal (relay discovery) for relay to the remote UE.

The remote UE transmits relay traffic (data) to the potential ProSe relay UE (ProSe UE-to-network relay). The potential ProSe relay UE (ProSe UE-to-network relay) receives the relay traffic and transmits the relay traffic to the (D)eNB. The (D)eNB receives the relay traffic.

The benefit of the mechanisms above that both ProSe Relay establishments for OoC Remote UEs and InC Remote UEs could be applied basically the same procedure, which will allow keeping the specification simple. So, such common procedure for all scenarios should be preferable for the ProSe Relay establishment.

Proposal 3: The Remote UE should ask the Potential ProSe Relay UEs through discovery whether the ProSe Relay operation is acceptable.

Proposal 4: The Potential ProSe Relay UE should indicate to the (D)eNB the request to serve as the ProSe Relay UE based on the request from the Remote UE.

If above mechanisms are introduced, the (D)eNB may simultaneously receive multiple ProSe Relay initiation requests from different potential ProSe Relay UEs. In this case, the (D)eNB needs to select the best potential ProSe UE as ProSe Relay UE. So, it will be useful for the potential ProSe Relay UE to indicate to the (D)eNB the PC5 link quality with the Remote UE as part of the ProSe Relay initiation request.

Proposal 5: If the Proposal 3 and the Proposal 4 are agreed, the potential ProSe Relay UE should indicate to the DeNB the PC5 link quality with the Remote UE as part of the request from the Remote UE.

In addition, U.S. Provisional Application No. 62/162,211 (filed May 15, 2015) is incorporated by reference herein in its entirety.

The invention claimed is:

1. A base station configured to manage a cell, comprising:
a controller configured to transmit, if a report indicating that a relay terminal configured to relay data by direct communication between a remote terminal and a network is not present in a vicinity of a radio terminal located within the cell or a report indicating that the relay terminal become not present in the vicinity, is received from the radio terminal, control information to the radio terminal, wherein
the control information is information for starting transmission of a discovery signal for discovering another radio terminal that can be the relay terminal.

2. The base station according to claim 1, wherein the control information includes at least any one of information on a transmission resource pool used only for discovering the another radio terminal that can be the relay terminal, information on transmission power of the discovery signal, information for transmitting, in a period of transmitting the discovery signal, a signal related to synchronization in a proximity service, and information for designating an application code used for the discovery signal.

3. The base station according to claim 2, wherein the information for transmitting the signal related to synchronization includes an identifier to be included into the signal related to synchronization.

4. The base station according to claim 1, wherein the controller starts establishing a UE-to-Network relay connection between the base station and the another radio terminal, upon receiving, from the radio terminal, a report indicating that the another radio terminal that can be the relay terminal is discovered.

5. The base station according to claim 4, wherein if the report indicating that the another radio terminal that can be the relay terminal is discovered includes information indicating a reception level of a signal related to synchronization transmitted from the another radio terminal, the controller determines whether or not to start establishing the UE-to-Network relay connection based on the information indicating the reception level.

6. The base station according to claim 1, wherein the controller transmits, to the another radio terminal that can be the relay terminal, second control information for starting reception of the discovery signal.

7. The base station according to claim 6, wherein the controller includes, into the second control information, at least some pieces of information included in the control information.

8. The base station according to claim 1, wherein the controller starts establishing a UE-to-Network relay connection between the base station and the another radio terminal, upon receiving, from the another radio terminal, a report indicating that the radio terminal is discovered.

9. The base station according to claim 8, wherein if the report indicating that the radio terminal is discovered includes information indicating a reception level of a signal related to synchronization transmitted from the radio terminal, the controller determines whether or not to start establishing the UE-to-Network relay connection based on the information indicating the reception level.

* * * * *